Dec. 17, 1963     J. H. HOLLYDAY     3,114,310

HAY BALER

Filed Aug. 27, 1962     2 Sheets-Sheet 1

INVENTOR
JAMES H. HOLLYDAY
BY
*Joseph A. Brown*
ATTORNEY

Dec. 17, 1963   J. H. HOLLYDAY   3,114,310
HAY BALER
Filed Aug. 27, 1962   2 Sheets-Sheet 2
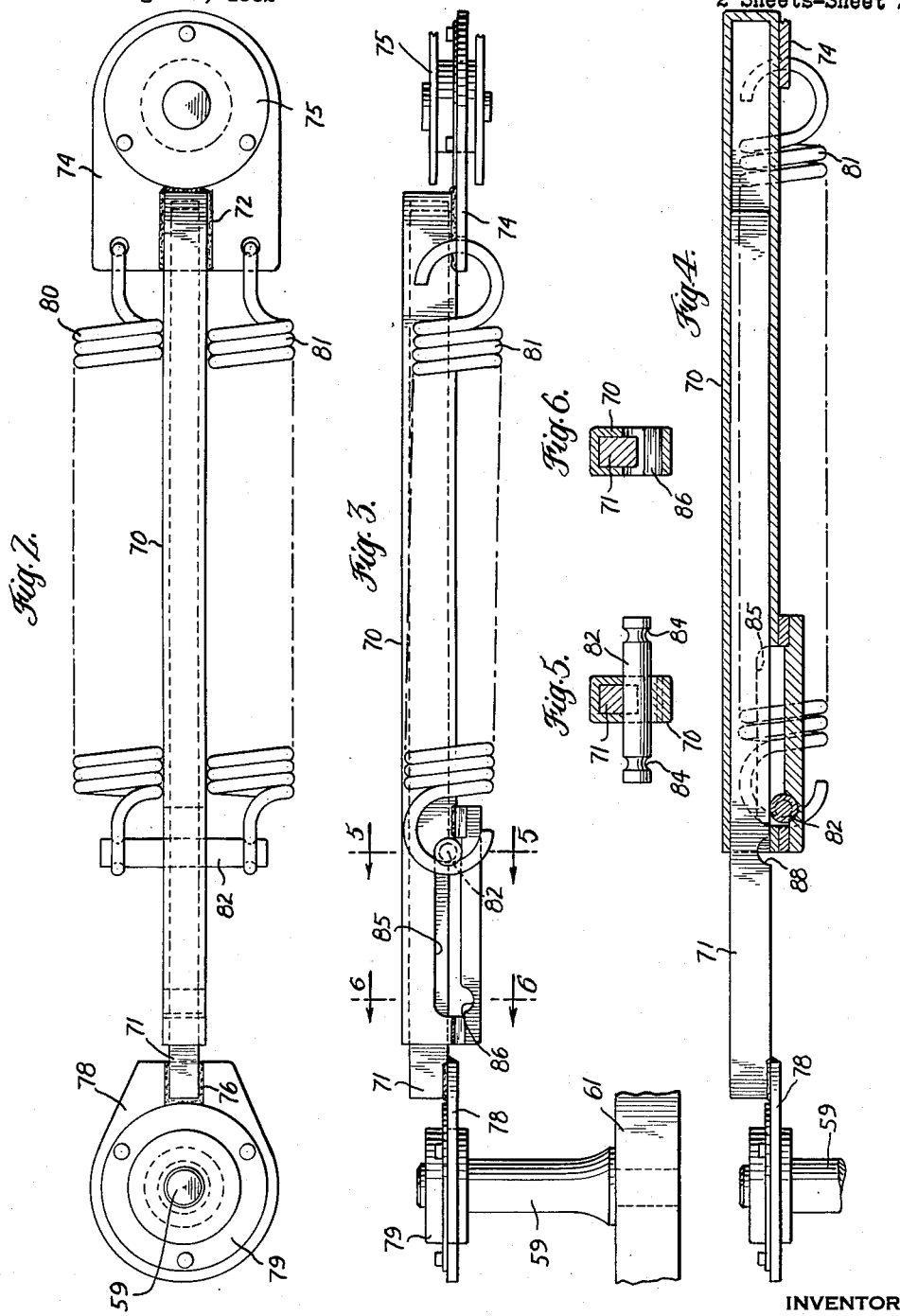
INVENTOR
JAMES H. HOLLYDAY
BY
ATTORNEY United States Patent Office 3,114,310
Patented Dec. 17, 1963

3,114,310
HAY BALER
James H. Hollyday, New Holland, Pa., assignor to Sperry Rand Corporation, New Holland, Pa., a corporation of Delaware
Filed Aug. 27, 1962, Ser. No. 219,622
4 Claims. (Cl. 100—142)

One object of this invention is to provide a baler feeder drive which includes spring means adapted to yield on a working stroke of the feeder and further adapted to release the driving force if an overloading condition reaches or exceeds a certain amount.

Another object of this invention is to provide a feeder drive of the character described so constructed that plugging of the feeder is prevented and an overloaded feeding condition is self-correcting.

Another object of this invention is to achieve the foregoing advantages with a structure which is simply designed and involves few parts thereby providing dependable operation and long life.

A further object of this invention is to provide a drive structure which is inexpensive to manufacture and repair thereby keeping to a minimum manufacturing costs and maintenance expenses.

Other objects of this invention will be apparent hereinafter from the specification and from the recital and in the appended claims.

In the drawings:

FIG. 2 is an enlarged plan view of the telescopic link of the drive means;

FIG. 3 is a side elevation of FIG. 2;

FIG. 4 is a part side elevation part longitudinal vertical section of the drive link and showing the parts extended;

FIG. 5 is a section taken on the line 5—5 of FIG. 3 looking in the direction of the arrows; and FIG. 6 is a section taken on the line 6—6 of FIG. 3 looking in the direction of the arrows.

Figure 1:
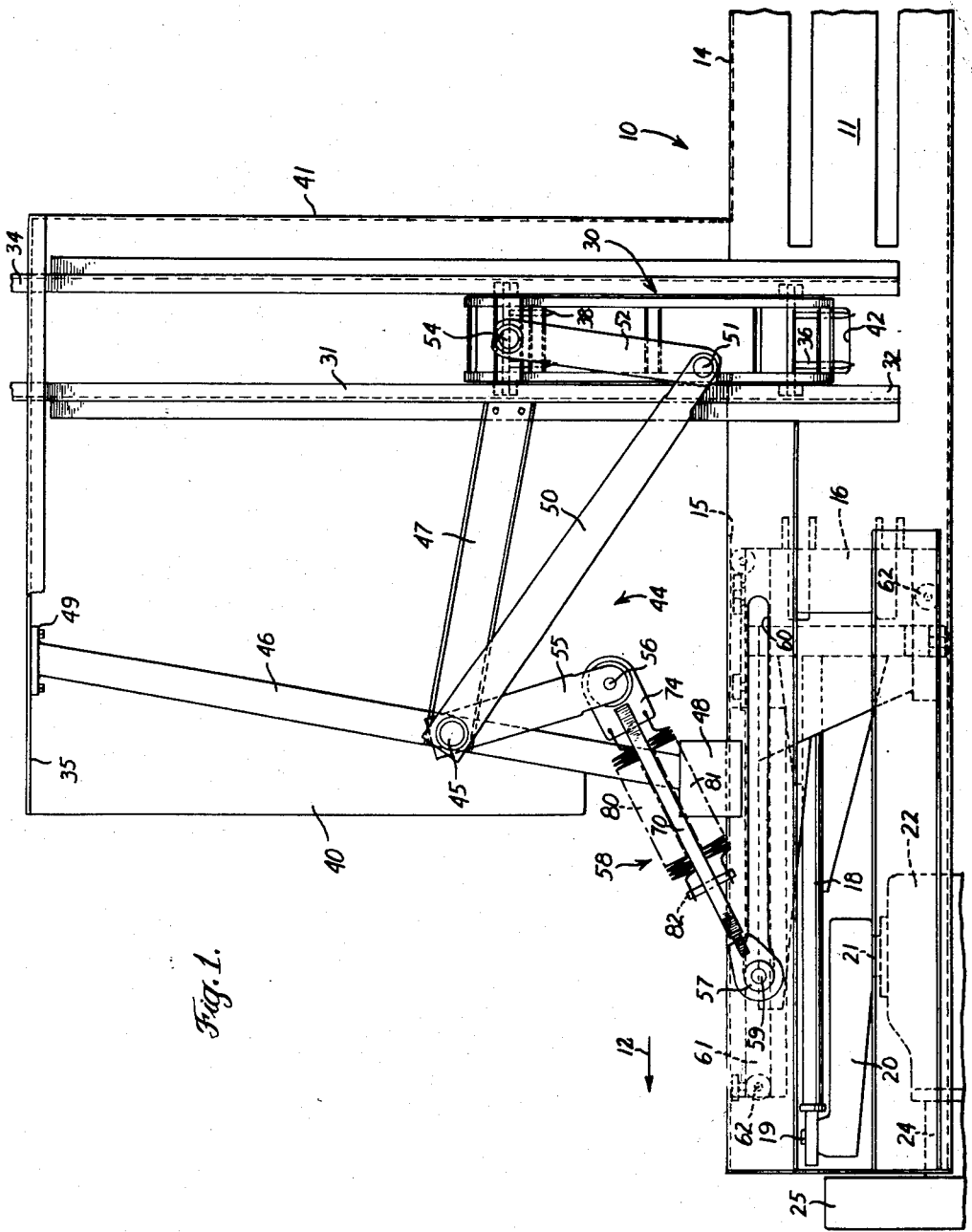
FIG. 1 is a generally diagrammatic plan view of a hay baler, the feeder of which is operated by drive means constructed according to this invention.

Referring now to the drawings by numerals of reference and first to FIG. 1, 10 denotes generally a hay baler having a bale case 11 which extends in a fore-and-aft direction relative to the direction of travel of the machine indicated by the arrow 12. One vertical side wall 14 of the bale case 11 has an infeed opening 15 through which hay and other crop material may be fed. Such hay is adapted to be compressed into bales by a plunger 16 reciprocable from a retracted position as shown in FIG. 1 and forwardly of the opening 15 to an extended position rearwardly thereof. The plunger is reciprocated by means of a connecting rod 18 pivotally connected at 19 to a crank arm 20. The crank arm is driven by and carried on the output shaft 21 of a gear box 22, which receives power from an input shaft 24 and a flywheel 25. The source of power for operating the baler may be a power-take-off connection to the tractor which tows the implement or from an engine mounted on the baler structure and suitably connected to the operative components of the machine.

For feeding crop material into the bale case 11, a feeder carriage 30 is provided which reciprocates rectilinearly in a direction transverse to the reciprocations of the plunger 16. Carriage 30 is reciprocable on a track 31 having an end 32 which extends on top of and is supported by bale case 11 and an outer end 34 supported on upright side wall 35 substantially laterally spaced from bale case side wall 14. Carriage 30 has depending feed fingers 36 and 38 which are operative to impart a feeding effect on crop material beneath the carriage to thereby convey it into the bale chamber 11. The hay to be baled is adapted to be deposited on a hay receiving platform 40 which extends laterally from the bale case side wall 14 and from the lower portion of the infeed opening 15. The hay is delivered from a conventional reel type mechanism, not shown, and the picked up hay travels rearwardly to a location beneath track 31. A transversely extending upright rear wall 41 is provided to stop the hay in its rearward travel and to allow it to accumulate beneath track 31.

In FIG. 1, the feeder carriage 30 is shown at the end of a feeding stroke. The fingers 36 extend downwardly through an opening or slot 42 in the top wall of the bale case. As is conventional, the fingers 36 and 38 are so constructed that they stand erect on a feeding stroke and pivot or lay back on a retracting stroke of the feeder carriage.

Feeder carriage 30 is reciprocated by a drive connection to plunger 16. Such connection comprises a bell crank 44 pivotally mounted at 45 for oscillation about a vertical axis. The bell crank is supported by a transversely extending support 46 connected at 48 to the bale case 14 and at 49 to wall 35. Support 46 is vertically spaced from the hay receiving platform 40. In addition to the support 46, a brace member 47 is provided which extends from the pivot 45 to the track 31.

Bell crank 44 has a leg 50 pivotally connected at 51 to a first link 52. Link 52 is pivotally connected at 54 to carriage 30 adjacent the remote end of the carriage relative to the bale case 11. The bell crank has a second leg 55 pivotally connected at 56 to a link 58 constructed according to this invention. Link 58 is pivotally connected at 57 to a pin 59 projecting upwardly through bale case 11 and reciprocable in a fore-and-aft direction in bale case slot 60. The plunger has a rearward extension 61 which carries the pin 59 and the plunger is guided in its reciprocating movement by means including rollers 62. As plunger 16 is reciprocated, the force is transmitted through the link 58 to oscillate bell crank 44. The oscillation of the bell crank operates through link 52 to reciprocate the carriage 30 and cause it to move toward and away from bale case 11 in precise timed relation with plunger 16.

If the feed fingers 36 and 38 on feeder carriage 30 engage an excessive amount of hay on a feeding stroke and the structure becomes overloaded, the link 58 is adapted to accommodate such overloading and to yield on a feeding stroke of the carriage. If the overloading condition exceeds a certain amount, then the drive to the carriage is disconnected completely, being however, connected up on the next return stroke of the device. The construction of the link 58 is shown in detail in FIGS. 2-6.

A pair of telescopic members 70 and 71 are provided. The member 70 is in the form of a rectangular sleeve which receives member 71 which is in the form of a rectangular rod. By their interengagement, the members are prevented from angularly pivoting relative to each other. Sleeve 70 is welded at 72 to the bracket 74 which carries bearing 75 for pivotally connecting link 58 to bell crank leg 55. Telescopic member 71 is welded at 76 to the bracket 78 for bearing 79 which is used in pivotally connecting link 58 to the pin 59 of the plunger 16.

On opposite sides respectively of the telescopic members, springs 80 and 81 are provided and connected at one end to the bracket 74, as shown. The opposite ends of the spring are connected to a transversely extending pin 82 notched at 84 to receive the end loops of the springs. Sleeve 70 has a pair of longitudinally extending diametrically opposite lateral slots 85 through which pin 82 extends. At the ends of the slots 85 remote from the springs 80 and 81, enlargements 86 are provided. The telescopic member 71 is provided with a transverse recess or notch 88 which normally receives pin 82. This structure comprises a releasable latch means operative as now described.

On a feeding stroke of the carriage 30, if an overloaded situation results, and the travel of the carriage is arrested, the telescopic members 70 and 71 are longitudinally extended against the resistance of the springs 80 and 81. As this extension takes place, the position of pin 82 relative to slots 85 changes. If the extension moves sleeve 70 to a location short of bringing pin 82 and enlargement 86 into register, then the parts merely extend and retract and a load is maintained on the feeder carriage. However, if the telescopic extension is of such magnitude that pin 82 and enlargements 86 come into register, then the pin is free to be forced out of the recess 83 in the telescopic member 71 and to become disengaged therefrom. The curved wall of the recess tends to cam the pin out. Such disengagement is shown in FIG. 4. When pin 82 is removed from recess 83, and drops into enlargements 86 of slots 85, the springs 80 and 81 are able to retract toward normal position and the driving force transmitted to the carriage 30 is released. On a next return stroke of the mechanism, the parts link up again and the components again assume their position as shown in FIGS. 2 and 3.

With this design, the carriage 30 is adapted to yield on a feeding stroke to accommodate various feeding conditions. The several inches of telescopic movement of members 70 and 71 without bringing pin 82 and enlargements 86 into register enables the drive to yield in accommodation of most feeding conditions. However, if an excessively large overloading results and the extension of telescopic members 70 and 71 is so substantial that the pin 82 reaches enlargements 86, then the parts are disconnected. Thus, if an overloading situation reaches a certain amount, the driving force to the carriage 30 is released.

As clearly shown, the structure employed is relatively simple both in the number of components used and in their design. Thus, the device can be manufactured at low cost. It is easily assembled and inexpensive to repair.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hay baler having an elongated bale chamber provided with a feed opening in a side wall thereof, a feeder reciprocal toward and away from said side wall and operative to convey hay through said opening, and drive means for reciprocating said feeder, said drive means comprising a pair of telescopic members longitudinally extendable, a pair of springs on opposite sides respectively of said members, said springs having adjacent ends connected to one of said telescopic members, and latch means connecting the opposite ends of said springs to the other of said telescopic members, said latch means being operative to disconnect said springs from said other telescopic member when said members have been extended a given amount.

2. A hay baler having a fore-and-aft extending bale chamber provided with a feed opening in a side wall thereof, a plunger reciprocable in said bale chamber to compress hay deposited therein into bales, a hay receiving platform extending from said one side wall, a bell crank mounted above said platform and having a pair of legs oscillatable about a vertical axis, feeder means connected to one of said legs and operable to convey hay into said bale chamber, and a link connecting the other of said legs to said plunger whereby reciprocation of said plunger causes oscillation of said bell crank, said link comprising a pair of telescopic members longitudinally extendable, a first of said members having an end connected to said plunger, a second of said members having an end connected to the other of said bell crank legs, spring means comprising a pair of springs on opposite sides respectively of said telescopic members, adjacent ends of said springs being connected to said second telescopic member, and latch means connecting the opposite ends of said springs to said first telescopic member.

3. A hay baler as recited in claim 2 wherein said latch means comprises a pin extending transversely of said telescopic members and having lateral ends to which said springs are connected, said first telescopic member having a transversely extending recess in which said pin normally seats and said second telescopic member having a sleeve provided with longitudinal slots enlarged at one end and such enlargements normally being located spaced from said recess but movable into register therewith upon a given extension of said telescopic means members whereupon said pin may drop out of said recess and release said springs.

4. A hay baler as recited in claim 3 wherein said telescopic members are rectangular in cross section to prevent angular movement of one relative to the other.

References Cited in the file of this patent

UNITED STATES PATENTS

| 1,091,449 | Westin | Mar. 24, 1914 |
| 2,720,073 | Freeman et al. | Oct. 11, 1955 |
| 2,854,809 | Starrett et al. | Oct. 7, 1958 |
| 2,926,601 | Tarbox et al. | Mar. 1, 1960 |
| 3,030,877 | McDuffie | Apr. 24, 1962 |